Patented Nov. 8, 1938

2,135,489

UNITED STATES PATENT OFFICE 2,135,489

METHOD OF CONTROLLING VISCOSITY IN EVAPORATED MILK

Charles O. Ball, River Forest, Ill., assignor to American Can Company, New York, N. Y., a corporation of New Jersey No Drawing. Application March 6, 1934, Serial No. 714,326

2 Claims. (Cl. 99—55)

The present invention relates to a method of controlling the viscosity of evaporated milk and has particular reference to the use of edible acids or the like added to the milk before or after evaporation so that a desired viscosity may be obtained in the final product and at the same time an improved color and taste.

The processing for sterilization of canned evaporated milk is today conducted in accordance with certain principles which have been established by the experience of the industry. These principles pertain to the effects of time, temperature and agitation of the milk during the process upon its viscosity and upon the coagulation of the finished product. A statement of three such principles follows.

1. Increase in time and/or temperature of the process results in higher viscosity of the evaporated milk or in more coagulation.

2. Agitation during the heat treatment gives smoothness of texture.

3. Agitation during the heat treatment results in a product of lowered viscosity. In view of this only a relatively small agitation of the milk has been possible in practice if any desired degree of viscosity is obtained.

Heretofore, sterilizing processes for evaporated milk have involved comparatively long times of holding at a temperature, for example, of 240°. The holding time for that temperature, plus the time required for raising the sterilizer and the milk to that temperature may comprise, for example, 35 minutes. This example of heat treatment (total 35 minutes, sterilizing temperature 240°) gives what is usually thought to be the best combination among those combinations which are adequate for sterilization and which give satisfactory viscosity and smoothness of texture with a moderate amount of agitation.

Each packer chooses as his process that which will produce, along with sterilization, the desired viscosity and smoothness of texture in the evaporated milk prepared from the raw milk of average character received from day to day. If, in a processing test of the evaporated milk, a sufficient degree of body or viscosity is not produced, the process is increased either in time or temperature or in both until the desired quality is produced. If the milk happens to be of such chemical nature that it has more than the average tendency to coagulate so that coagulation is produced by the process, either the process is reduced in time or temperature (provided this can be done without danger of understerilization) or a small portion of a chemical, such as sodium bicarbonate, ammonium phosphate or sodium citrate, known as a "corrective", is added to the evaporated milk to neutralize a portion of the acid in the milk and produce such a chemical state that the milk will be able to withstand the sterilizing process without the production of coagulation.

This chemical readjustment of the milk is made after the milk has been evaporated.

It is well known that evaporated milk assumes a caramelized, or cooked taste and takes on a darker color as a result of the sterilizing heat process. It is believed that most people regard these characteristics as undesirable. The ordinary, favored process referred to, consisting of a total time of approximately 35 minutes, imparts these characteristics to a marked degree.

Attempts to reduce these undesirable effects are constantly being made. Such attempts have included the reduction in time of sterilization, with or without increase in temperature, but this has invariably resulted in such a loss in viscosity of the processed milk and in such an attendant increase in cream separation during storage that the resulting product is not satisfactory as a practical commercial evaporated milk. Prior to my invention, as far as can be determined, no satisfactory results have been obtained along this line and the standard form of dark colored, caramelized, evaporated milk has been tolerated as a necessity.

In regard to the amount of agitation to which cans of evaporated milk are subjected during the sterilizing process, the following quotation is taken from page 743 of Mojonnier and Troy's "The Technical Control of Dairy Products" (1925), a foremost authority on the packing of evaporated milk:

"Too rapid reeling tends to destroy the viscosity and to produce a grainy finished product . . . The proper speed of the reel is from 6 to 10 turns per minute depending upon the diameter of the sterilizer."

The instant method invention with its use of acid has made it possible to vary the elements of time, temperature and agitation of the process within wide limits and at the same time to positively control the viscosity, the coagulation, and other desirable characteristics of the final product. In fact it has been found that this acid control allows for practically unlimited agitation of the milk without sacrificing viscosity, that the amount of agitation desirable depends primarily upon the time and temperature of process, and that, in general, the higher the sterilizing temperature, the greater the amount of agitation that must be used to produce the best results. Best results, as defined in terms of high viscosity with smooth texture will, in some cases, be obtained with an agitation of the can represented by over 100 turns per minute. When a short, high temperature, process is used viscosity with smooth texture is produced and the degree of such is substantially proportional to the degree of agitation used.

A greater variation of raw milk can be successfully converted into the evaporated product, because, no matter what the magnitude of the coagulating tendency of the raw milk may be, the milk can be adjusted in character so as to be entirely satisfactory for canning with the use of a properly chosen sterilizing process of simple character by adding acid to the raw milk. In fact, the necessary acid may be produced in milk by controlled bacterial action upon the milk sugar. Heretofore, such bacterial action has been regarded as obstructive to success in evaporated milk canning. This fact is indicated in the following quotation from page 748 of Mojonnier and Troy's book, cited above:

"The difficulties encountered in sterilizing evaporated milk as a rule increase as the content of titratable acidity increases. This is particularly true if the titratable acidity is due in part, at least, to the decomposition of the milk sugar into lactic acid by bacterial growth,—meaning any increase of titratable acidity over that in the milk as drawn from the cow."

By the use of such a method an evaporated milk is obtained which is practically without caramelization or cooked taste and is substantially without any darkening in color, thus more nearly resembling the natural milk.

An object of the invention therefore is the provision of a method of canning wherein the viscosity of the canned evaporated milk is controlled by the use of an edible acid so that a uniform product is obtained having a smooth texture and one wherein the processing time is greatly shortened.

Another object of the invention is the provision of an acid control method for processing evaporated milk which produces a desired product from raw milk having a greater range in its initial acid condition than is possible by present standard processes.

A further object of the invention is the provision of a method of processing and canning evaporated milk which includes the addition of acid to the milk either before or after evaporation so that heat penetration during subsequent sterilization may be accelerated by agitation of the can and its contents.

A still further object of the invention is the provision of a process of canning and sterilizing evaporated milk by the use of an acid control and flash sterilization which includes relatively high temperatures and short time.

Another object of the invention is the provision of a process of canning and sterilizing evaporated milk in which chemical standardization of the product may be accomplished by means of bacterial fermentation of the raw milk.

Yet a further object of the invention is the provision of a method of processing evaporated milk which includes the addition of acid to the milk to produce less coagulation and a higher viscosity than would be present if no acid were added.

A still further object of the invention is the provision of an acid control method for processing evaporated milk which produces high viscosity in the milk during heating and cooling while continuously flowing under violent agitation.

In the instant invention as a preparatory step and prior to the addition of acid to the raw milk, examination is made of the milk. This milk may be tested by obtaining values of titratable acidity. Coagulating tests of the raw milk may also be made. Both tests may be employed, and one checked against the other and this proceeding is preferred as the results of titration alone, it is felt, are not sufficiently reliable for the present purpose of accurately ascertaining the proper amount of acid to be added.

The values of titratable acidity will vary in accordance with the particular titration methods employed and the figures of such values will depend upon the method of titration used. When the titration test is made by the Kelley Electrometric method, for example, a raw milk having a titratable acidity calculated as lactic acid of not over 0.08 per cent, is best for producing evaporated milk of the American standard of total solids and fat content, when the milk is canned by the usual commercial methods. If the ordinary colorimetric method of titration is used, the value will not be over 0.15 per cent instead of the 0.08 per cent as given above.

For canning and processing by temperature higher than that used in the example given above, raw milk having titratable acidity determined by the Kelley Electrometric method of between 0.08 per cent and 0.095 per cent and determined by the ordinary colorimetric methods, of between 0.15 per cent and 0.18 per cent serves best for the preparation of American standard evaporated milk.

Where the acid is added to the raw milk before evaporation, and such prior addition is preferred, coagulation tests are also nearly always used. These coagulation tests may be made in accordance with well known methods used in the industry today.

By means of the titration and coagulation tests it is possible to determine within practical limits the proper amount of acid to be added to the raw milk before evaporation in order to produce the desired results which are contemplated by the present invention. Such acid may be any one of the many edible acids available but lactic acid is thought to be the best for the purpose according to present methods of procedure in processing. Hydrochloric acid and citric acid are also satisfactory.

Acid in only dilute form is added to the raw milk, being diluted, for example, in water so that the strength is not greater than one per cent. The milk is vigorously agitated while the acid is being added. Where the acid is of too concentrated a form localized coagulation in the milk may result as the acid is introduced. Ordinarily, the amount of such additional acid, lactic acid for example, will lie within the range of from 0.002 per cent to 0.03 per cent of the amount of raw milk by weight. Where hydrochloric acid is used the amount will lie within the range of from 0.001 per cent to 0.02 per cent of the amount of raw milk by weight.

The amount of acid required to standardize milk for evaporation, like the viscosity and coagulation functions previously discussed, is a direct function of the time and temperature to be used in sterilizing the product. It is also affected by the amount of agitation the milk is to receive during the heating period. The most satisfactory results in carrying out the steps of the instant invention are obtained by employing the correct combination of acid, time of heating, temperature of heating, and agitation during the heating. Such a combination is not hard to obtain as will be pointed out hereinafter.

To show that there is no practical minimum limit to the length of heating time that will suffice to produce any desired degree of viscosity in evaporated milk, an instance of the application of the principles of this invention will be cited. It has been found, for example, that the acidity of milk can be so adjusted that very high viscosity (with a rating of 300 on the Mojonnier-Doolittle scale) can be produced in evaporated milk by a flash heating of not over 15 seconds duration at a temperature of approximately 260° with rapid cooling at the end of the heating period. Viscosity with a rating of 300 is higher than is ever desired in commercial evaporated milk, and a heating time of 15 seconds duration is undoubtedly near the minimum limit of time that will ever be used in sterilization by heat. Under the conditions cited, it is necessary that the milk be kept in constant violent agitation throughout the heating period in order to avoid coagulation.

One way that has been found to obtain excellent results from the application of the method herein disclosed is to can evaporated milk consisting of a mixture of non-acidified milk, or of less than adequately acidified milk, with milk that has been more than adequately acidified. Such a mixture having a given nominal percentage of added acid, for example, 0.008 per cent on the basis of the whole milk, has been found to give a sterilized product of higher viscosity without coagulation, than milk condensed from whole milk to which acid in the same percentage was added. It has been found, for example, that higher viscosity without coagulation is obtained from a mixture consisting of one part of milk that has not been acidified and two parts of milk condensed from whole milk acidified to the extent of 0.012 per cent of lactic acid, than is obtained from milk that has been condensed from whole milk that was acidified to the extent of 0.008 per cent of lactic acid. The resultant amount of added acid in the two lots of evaporated milk is the same—namely, 0.008 per cent on the basis of whole milk.

According to this principle, therefore, final standardization of the milk may be done just before canning by mixing, in the proper proportion, milk from two batches, the raw milk for one of which was acidified more than adequately for canning.

One feature relating to viscosity and coagulation might be mentioned which should be considered when determining the amount of acid to be added to the raw milk. The addition of a small amount of acid to the raw milk before evaporation, up to a certain point, for example, 0.003 per cent of the total amount of raw milk by weight, results in a final sterilized evaporated product having greater viscosity but less coagulation than is obtained under the same processing conditions from the milk to which no acid has been added. In other words, the addition of acid to the raw milk up to this critical point is accompanied by an increase in viscosity and a decrease in coagulation. This increase and decrease is in regular ratio. After the critical point, however, both viscosity and coagulation increase proportionally to the addition of acid.

The exact location of this critical point changes to some extent with variation in the chemical and physical nature of the raw milk, with variation in the degree of concentration of the milk, and with variation in the characteristics of time, temperature, and agitation in the sterilizing process.

It has been previously mentioned that it is desirable that the addition of acid be made to the raw milk before the forewarming treatment and it is believed that the production of a desirable degree of viscosity in the sterilized evaporated milk without undesirable coagulation is best served when this is done. When the acid is added to the milk after evaporation, the increase in viscosity is more likely to be accompanied by coagulation. To obtain best results in the light of present experience it appears desirable to previously effect a certain chemical union between the acid and the various milk constituents such as casein and lact-albumin, and this chemical reaction apparently is promoted by the treatment of forewarming.

Either before or after acidification (preferably before) the raw milk should be clarified. Such clarification is for the removal of minute particles of impurities from the milk. This may be accomplished by centrifuging in a continuous manner in any suitable machine for this purpose, such machine resembling a cream separator, this being used by some canners of evaporated milk. Clarification may also be carried out by filtering the milk.

As soon as the raw milk has been clarified and acidified it is preliminarily heated in a step called forewarming. This forewarming may be done in any suitable manner as in a forewarming tank through which the milk is passed.

After forewarming any suitable evaporating process may be used such as the introduction of the milk into suitable vacuum pans. The evaporation process is followed by homogenization, this being a usual step in evaporated milk processes. After homogenization the milk is cooled in any suitable manner. In commercial operations in present use, the evaporated milk is received in storage tanks, in which fermentation is prevented by refrigeration.

It is usually considered of advantage to hold evaporated milk in storage for a length of time—twelve hours or more—before the milk is given the sterilizing treatment. It is at this point that the milk, evaporated by the usual commercial methods, is tested for its total solids and fat contents. Standardization, to effect proper total solids content, is then made by the addition of water. When chemical correction is required, this is effected by the addition of sodium bicarbonate, a citrate, a phosphate or another chemical which will neutralize the effect of some of the acid present in the milk.

This step of neutralizing is not required in milk evaporated according to the present invention because the amount of acid required is more than the normal amount for milk, and the acid content has already been increased accordingly.

As previously suggested it is also possible in carrying out the instant method, to add the lactic or other acid for the purpose of obtaining the required viscosity after the evaporating step and where this is done the addition of the acid may be made in the milk when it is in the storage tanks prior to canning. If the acid is added at this point in the process better results are obtained where the milk is again heated for a relatively short time.

The next step of the present invention is the filling of the milk in cans which are then sealed and sterilized in any suitable manner." Commercial methods of sterilization may be employed and require for example, the retorting of cans for a period of approximately three minutes at a temperature of 260°, after which the cans are cooled and then labeled and boxed in any suitable manner in accordance with the method used.

As a matter of fact the actual acid strength adjustment used in the milk for canning is relatively very small. After the final adjustment there is no evidence by organoleptic tests, of the presence of such acids in the milk either before or after processing. This invention therefore provides a simple and accurately controlled method of effecting the viscosity of milk that is evaporated.

It will be understood, that, in the method herein disclosed, certain chemicals, other than acid, such as calcium compounds, which have an effect similar to that of acid upon milk, may be used in place of acid to produce the desired results.

The addition of acid and its control as previously set forth, permits a different handling of the milk and allows for greater variety in the various steps of processing than has been heretofore possible. Such acidified evaporated milk, for example, may be rapidly and continuously moved and may be violently agitated through relatively high sterilizing temperatures and also through cooling means and at the time a high viscosity is produced.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of processing evaporated milk, which comprises adding to the raw milk an amount of edible acid sufficient to produce a desired normal degree of viscosity which will not exceed 300 on the Mojonnier-Doolittle scale in the final product when used, which amount is in the range of .001 to .03 per cent on the basis of weight of said raw milk, evaporating the acidulated milk, filling and hermetically sealing the evaporated milk in cans, and subjecting the canned product to flash sterilization at a temperature of approximately 260° during violent agitation and then cooling the canned milk during violent agitation thereof, which agitations comprise movement equivalent to rotating the can over 100 turns per minute whereby, in addition to obtaining the desired degree of viscosity, the flavor and color characteristics of the milk remain substantially unchanged.

2. The method of processing evaporated milk which comprises evaporating a quantity of milk having a low titratable acidity, adding acid to a second quantity of milk to produce a relatively high titratable acidity, separately evaporating the latter, mixing the two in a proportion that will produce the desired degree of viscosity which will not exceed 300 on the Mojonnier-Doolittle scale in the final product when used, filling and hermetically sealing the mixed acidulated evaporated milk in cans, and subjecting the same to a flash sterilization at a temperature of about 260° during violent agitation, and then cooling the canned milk during violent agitation thereof, which agitations comprise movement equivalent to rotating the can over 100 turns per minute whereby, in addition to obtaining the desired degree of viscosity, the flavor and color characteristics of the milk remain substantially unchanged.

CHARLES O. BALL.